(12) United States Patent
Park (10) Patent No.: US 11,969,657 B2
(45) Date of Patent: Apr. 30, 2024

(54) APPARATUS AND METHOD FOR PROVIDING GAME BASED ON GENERATED IMAGE

(71) Applicant: NEXON KOREA CORPORATION, Seongnam-si (KR)

(72) Inventor: Ung Suk Park, Seongnam-si (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 1 day.

(21) Appl. No.: 17/360,577

(22) Filed: Jun. 28, 2021

(65) Prior Publication Data

US 2021/0402305 A1 Dec. 30, 2021

(30) Foreign Application Priority Data

Jun. 30, 2020 (KR) .................. 10-2020-0080267

(51) Int. Cl.
*A63F 13/79* (2014.01)
*A63F 13/2145* (2014.01)
*A63F 13/25* (2014.01)
*G06F 3/0482* (2013.01)

(52) U.S. Cl.
CPC .......... *A63F 13/79* (2014.09); *A63F 13/2145* (2014.09); *A63F 13/25* (2014.09); *G06F 3/0482* (2013.01)

(58) Field of Classification Search
CPC ...... A63F 13/79; A63F 13/25; A63F 13/2145; G06F 3/0482
See application file for complete search history.

(56) References Cited

U.S. PATENT DOCUMENTS

| 8,282,484 B2* | 10/2012 | Toriyama | A63F 13/10 |
| | | | 463/37 |
| 8,558,792 B2* | 10/2013 | Momose | A63F 13/822 |
| | | | 463/31 |
| 8,845,426 B2* | 9/2014 | Ohta | A63F 13/211 |
| | | | 463/31 |
| 9,463,381 B2* | 10/2016 | Miki | A63F 13/426 |

(Continued)

FOREIGN PATENT DOCUMENTS

JP 2014-150848 A 8/2014
KR 10-2014-0089460 A 7/2014

(Continued)

OTHER PUBLICATIONS

Jackui, "RPG Maker MV Lecture SE.01 16 Item", Youtube Video, Dec. 19, 2015 Retrieved from the Internet: URL https://www.youtube.com/watch?v=8p4zT3nvX0U (6 pages).

(Continued)

*Primary Examiner* — Chase E Leichliter
(74) *Attorney, Agent, or Firm* — Sughrue Mion, PLLC (57) ABSTRACT

Disclosed herein are an apparatus and method for providing a game. According to an aspect, there is provided an apparatus for providing a game, the apparatus including: a controller configured to generate an image based on input from a user who plays a game, to generate a game object by matching at least one effect to the image, and to provide the effect corresponding to the game object when a request for the use of the game object is received in the game; and storage configured to store the game object.

13 Claims, 7 Drawing Sheets

(56) References Cited

U.S. PATENT DOCUMENTS

| | | | | |
|---|---|---|---|---|
| 9,517,416 B1* | 12/2016 | Curtis | A63F 13/63 |
| 9,561,431 B1* | 2/2017 | Pulido | A63F 9/0612 |
| 10,363,486 B2* | 7/2019 | Rath | G06F 8/34 |
| 10,493,363 B2* | 12/2019 | Yan | A63F 13/35 |
| 10,546,406 B2* | 1/2020 | Yan | A63F 13/63 |
| 10,974,150 B2* | 4/2021 | Reiche, III | A63F 13/69 |
| 11,040,286 B2* | 6/2021 | Reiche, III | A63F 13/795 |
| 11,115,712 B2* | 9/2021 | Wyatte | G06F 18/24 |
| 11,192,028 B2* | 12/2021 | Eatedali | A63F 13/79 |
| 2005/0164794 A1* | 7/2005 | Tahara | A63F 13/426 463/43 |
| 2006/0094502 A1* | 5/2006 | Katayama | A63F 13/2145 463/31 |
| 2006/0227139 A1* | 10/2006 | Momose | A63F 13/822 345/441 |
| 2007/0063986 A1* | 3/2007 | Hoga | A63F 13/426 345/173 |
| 2007/0105626 A1* | 5/2007 | Cho | A63F 13/426 463/37 |
| 2008/0004118 A1* | 1/2008 | Van Luchene | A63F 13/30 463/42 |
| 2010/0053206 A1* | 3/2010 | Ohnishi | G06T 13/80 345/619 |
| 2010/0079388 A1* | 4/2010 | Ohnishi | G06F 3/04883 345/173 |
| 2010/0173701 A1* | 7/2010 | Van Luchene | G06Q 40/00 463/29 |
| 2010/0174593 A1* | 7/2010 | Cao | A63F 13/12 705/14.12 |
| 2010/0211900 A1* | 8/2010 | Fujioka | G06Q 30/0233 705/347 |
| 2010/0280919 A1* | 11/2010 | Everett | G06Q 30/00 705/28 |
| 2011/0169853 A1* | 7/2011 | Oiwa | G06T 11/203 345/589 |
| 2011/0214093 A1* | 9/2011 | Nishimura | G06F 3/04883 715/863 |
| 2011/0256937 A1* | 10/2011 | Van Luchene | A63F 13/69 463/42 |
| 2011/0263322 A1* | 10/2011 | Van Luchene | A63F 13/795 463/29 |
| 2011/0298823 A1* | 12/2011 | Kitahara | G06T 19/006 345/632 |
| 2012/0044177 A1* | 2/2012 | Ohta | A63F 13/2145 345/173 |
| 2012/0238359 A1* | 9/2012 | Itahana | A63F 13/5255 463/43 |
| 2012/0258796 A1* | 10/2012 | Ohta | G06T 19/00 463/32 |
| 2012/0320061 A1* | 12/2012 | Johnston | G06F 3/0484 345/441 |
| 2012/0324385 A1* | 12/2012 | Johnston | G06F 30/20 715/765 |
| 2013/0288762 A1* | 10/2013 | Yoshie | A63F 13/00 463/8 |
| 2015/0050997 A1* | 2/2015 | Suzman | A63F 13/55 463/31 |
| 2015/0352435 A1* | 12/2015 | Imai | A63F 13/92 463/9 |
| 2016/0059126 A1* | 3/2016 | Ye | A63F 13/2145 463/31 |
| 2017/0340960 A1* | 11/2017 | Kurabayashi | A63F 13/95 |
| 2018/0126277 A1* | 5/2018 | Yan | A63F 13/25 |
| 2019/0030429 A1* | 1/2019 | Nishikawa | A63F 13/822 |
| 2020/0094146 A1* | 3/2020 | Laker | A63F 13/69 |
| 2020/0360809 A1* | 11/2020 | Rhyoo | A63F 13/537 |
| 2021/0402305 A1* | 12/2021 | Park | G06F 3/0482 |

FOREIGN PATENT DOCUMENTS

| | | |
|---|---|---|
| KR | 10-1479277 B1 | 1/2015 |
| KR | 10-1817234 B1 | 2/2018 |
| KR | 10-2018-0083009 A | 7/2018 |
| KR | 10-2018-0136830 A | 12/2018 |
| KR | 10-2019-0106971 A | 9/2019 |

OTHER PUBLICATIONS

Minho Ji, "[Guide] Accurate order is essential for victory! Stone age, Importance of using skill in proper order", INVEN, Jun. 30, 2016, Retrieved from the Internet: URL https://www.inven.co.kr/webzine/news/?news=159276 (2 pages).

* cited by examiner

APPARATUS AND METHOD FOR PROVIDING GAME BASED ON GENERATED IMAGE

CROSS-REFERENCE TO RELATED APPLICATION

This application claims the benefit of Korean Patent Application No. 10-2020-0080267 filed on Jun. 30, 2020, which is hereby incorporated by reference herein in its entirety.

BACKGROUND

1. Technical Field

The embodiments disclosed herein relate to an apparatus and method for providing a game, and more particularly to an apparatus and method for providing a game that use a game object produced by a user.

2. Description of the Related Art

Recently, with the development of electronic devices such as smartphones, games can be played anywhere at any time. In games, various types of content are provided to users for the interest and fun of the games.

Such content is set by a game operator. For example, the appearance and characteristics of an item are set by a game operator, so that users can play a game using the item according to preset information.

An item is an optional element for play, and significantly affects the outcome of a game. However, conventional games are limited to the provision of items having appearances already determined by game operators. Korean Patent Application Publication No. 10-2014-0089460 proposes a method for providing an item. More specifically, the method for providing an item includes the step of displaying items purchasable by a user and items acquired in a game on a touch screen, the step of determining an item, selected by the user from among the purchasable items or acquired items, to be an item to be used in the game, and the step of providing the selected item in the game.

The related art literature discloses only a technology in which items available in a game are presented and an item can be selected from among the present items. Accordingly, the items are limited, so that a problem arises in that even when items are possessed and used, the corresponding process is predictable and simple and thus it makes the game boring.

Therefore, there is a need for a technology for overcoming the above-described problem.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

The embodiments disclosed herein are intended to propose an apparatus and method for providing a game.

The embodiments disclosed herein are intended to propose an apparatus and method for providing a game that use a game object produced by a user.

The embodiments disclosed herein are intended to propose an apparatus and method for providing a game that impart an effect to a game object produced by a user.

The embodiments disclosed herein are intended to propose an apparatus and method for providing a game that enable a game object produced by a user to be traded and shared.

As a technical solution for accomplishing the above objects, according to an embodiment, there is provided an apparatus for providing a game, the apparatus including: a controller configured to generate an image based on input from a user who plays a game, to generate a game object by matching at least one effect to the image, and to provide the effect corresponding to the game object when a request for the use of the game object is received in the game; and storage configured to store the game object.

According to another embodiment, there is provided a method for providing a game, the method being performed by an apparatus for providing a game, the method including: generating an image based on input from a user who plays a game; generating a game object by matching at least one effect to the image; and providing the effect corresponding to the game object when a request for the use of the game object is received in the game.

According to still another embodiment, there is provided a non-transitory computer-readable storage medium having stored thereon a program that, when executed by a processor, causes the processor to execute a method for providing a game. The method for providing a game includes: generating an image based on input from a user who plays a game; generating a game object by matching at least one effect to the image; and providing the effect corresponding to the game object when a request for the use of the game object is received in the game.

According to still another embodiment, there is provided a computer program that is executed by an apparatus for providing a game and stored in a medium in order to perform a method for providing a game. The method for providing a game includes: generating an image based on input from a user who plays a game; generating a game object by matching at least one effect to the image; and providing the effect corresponding to the game object when a request for the use of the game object is received in the game.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component arranged therebetween." Furthermore, when one portion is described as "including" one component, this does not mean that the portion does not exclude another component but means that the portion may further include another component, unless explicitly described to the contrary.

The embodiments will be described in detail below with reference to the accompanying drawings.

Prior to the following description, the meanings of the terms used below will be defined first.

In the following description, the term "game space" refers to a virtual space in which a game is played. A game space is represented by two-dimensional graphics or three-dimensional graphics, and includes an area having a predetermined range in which game objects to be described later can be used or moved. In one game, a plurality of game spaces designed differently from each other may be selectively provided, and each user may select one of them, or access to only some of the game spaces may be allowed according to the game level of each user.

The term "game object" refers to a graphic object that is used or placed in the above-described game space and affects the outcome of a game. In particular, a game object includes objects which are selected or moved by the control of a user or whose states are changed by the control of a user, i.e., objects which are controlled by a user. For example, a game object may be a character of a roll playing game (RPG), a card of a card game, a block of a puzzle game, an item, or the like.

Furthermore, the term "item" is a game element used to improve the outcome of game performance of a user. An item may be a game object or some other game element that at least temporarily improves the game performance ability of a control target controlled by a user among the above-mentioned game objects, at least temporarily regresses the game performance ability of objects blocking the game performance of a user or a game object controlled by a counterpart user among the game objects, or additionally provides a game performance opportunity given to the user or an opportunity to perform a specific action or exercise a special ability in a game.

Terms requiring descriptions, other than the terms defined above, will be separately described below.

Figure 1:
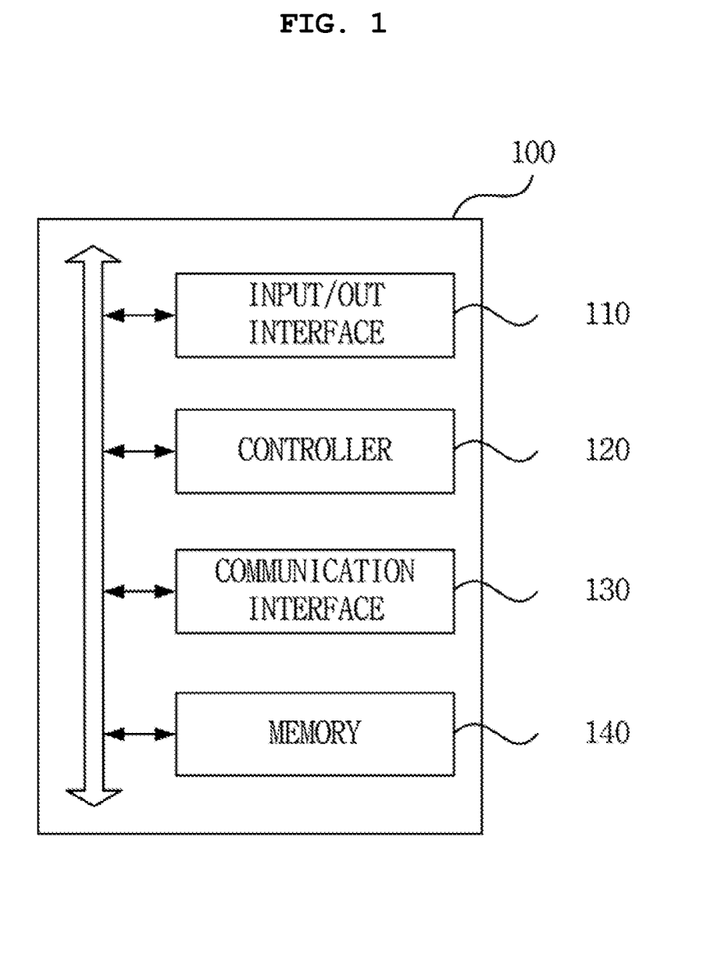
FIG. 1 is a block diagram illustrating an apparatus for providing a game according to an embodiment.

FIG. 1 is a block diagram showing an apparatus 100 for providing a game according to an embodiment.

The apparatus 100 for providing a game stores various types of information required for the provision of a game, and detects and records various events occurring in the game, thereby enabling the time-series progression of the game.

The apparatus 100 for providing a game may be implemented as an electronic terminal or a server-client system. The system may include an electronic terminal on which an online service application for interaction with a user is installed.

In this case, the electronic terminal may be implemented as a computer, a portable terminal, a television, a wearable device, or the like that can connect to a remote server over a network or connect with other terminals and a server. In this case, the computer includes, e.g., a notebook, a desktop, a laptop, and the like each equipped with a web browser. The portable terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type that can be directly worn on a human body, such as a watch, glasses, an accessory, clothing, shoes, or the like, and can access a remote server or be connected to another terminal directly or via another information processing device over a network.

In addition, the server may be implemented as a computer capable of communicating over a network with an electronic terminal on which an application or web browser for interaction with a user is installed, or may be implemented as a cloud computing server. Furthermore, the server may include a storage device capable of storing data, or may store data through a third server. Moreover, the server may communicate with another user terminal.

As described above, the apparatus 100 for providing a game may be implemented in the form of any one of an electronic terminal and a server-client system. When the apparatus 100 is implemented as a server-client system, components constituting the apparatus 100 for providing a game may be implemented in a plurality of physically separated servers, or may be implemented in a single server.

Referring to FIG. 1, the apparatus 100 for providing a game according to the present embodiment may include an input/output interface 110, a controller 120, a communication interface 130, and memory 140.

The input/output interface 110 may include an input interface configured to receive input from a user, and an output interface configured to display information such as the outcome of performance of a task, the status of the apparatus 100 for providing a game, etc. For example, the input/output interface 110 may include an operation panel configured to receive user input, and a display panel configured to display screens.

More specifically, the input interface may include devices capable of receiving various types of user input, such as a keyboard, physical buttons, a touch screen, a camera, a microphone, etc. Furthermore, the output interface may include a display panel, a speaker, etc. However, the input/output interface 110 is not limited thereto, but may include configurations capable of supporting various types of input and output.

The controller 120 may control the overall operation of the apparatus 100 for providing a game, and may include a processor such as a central processing unit (CPU). The controller 120 may control other components included in the apparatus 100 for providing a game so that they can perform an operation corresponding to user input received through the input/output interface 110.

For example, the controller 120 may execute a program stored in the memory 140, may read data stored the memory 140, and may store a new file in the memory 140.

The controller 120 will be described in greater detail with reference to FIG. 2 below.

The communication interface 130 may perform wired/wireless communication with another terminal or a network. To this end, the communication interface 130 may include a communication module that supports at least one of various wired/wireless communication methods.

Various types of data, such as a file, an application, and a program, may be installed and stored in the memory 140. For example, the memory 140 may store data, such as an image, an effect, and/or a game object, produced by a user.

The controller 120 may access and use data stored in the memory 140, or may store new data in the memory 140. Furthermore, the controller 120 may execute a program installed in the memory 140. Referring to FIG. 1, a program configured to perform a method for providing a game may be installed in the memory 140.

According to an embodiment, when a request such as a request for the generation of a game object is received by receiving an input from a user through the input/output interface 110, the controller 120 may perform the method for providing a game by executing a program stored in the memory 140.

Figure 2:
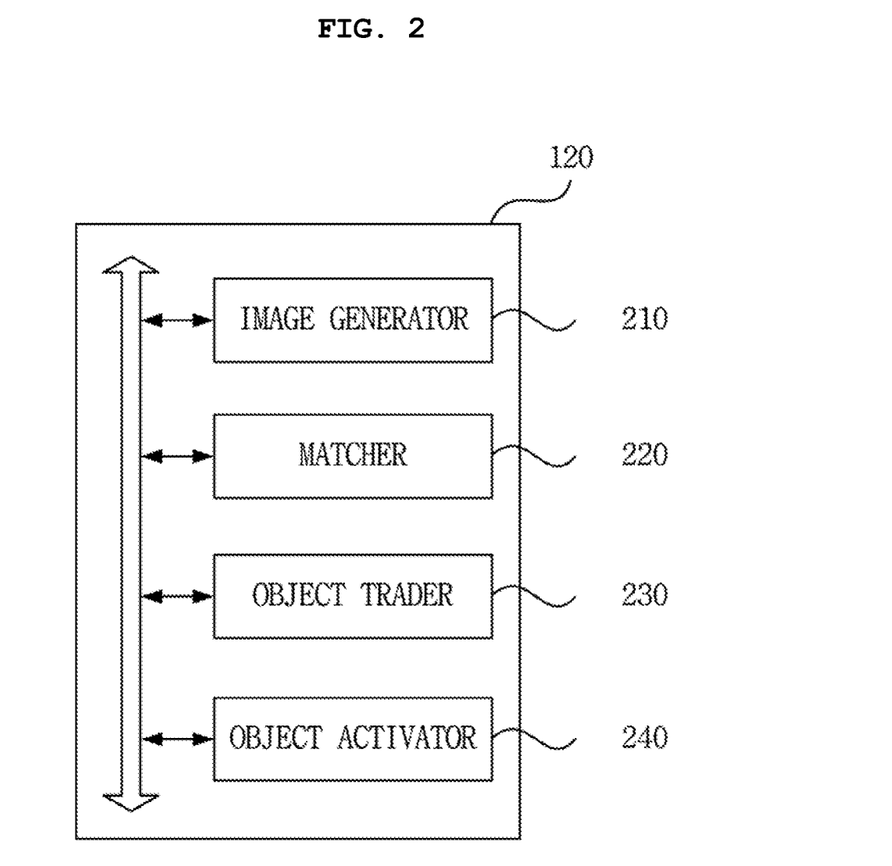
FIG. 2 is a block diagram illustrating the controller of the apparatus for providing a game according to an embodiment.

Meanwhile, FIG. 2 is a block diagram illustrating the controller of the apparatus for providing a game according to the embodiment described in the present specification, and FIGS. 3 to 6 are exemplary views illustrating the controller according to the embodiment.

As shown in FIG. 2, the controller 120 includes an image generator 210, a matcher 220, an object trader 230, and an object activator 240.

The image generator 210 generates an image based on the input of a user.

To this end, according to an embodiment, the image generator 210 may generate an image by combining one or more figures selected by the user.

In this case, the "figure" is a shape or a form, includes a point, a line, a surface, a solid, and a set of them, and may also include an image having already been generated or an image constituting a game object.

When one or more figures are selected by the user, the image generator 210 may generate an image by combining the figures in such a manner as to display all the figures by overlapping them or to delete part of a figure located below within an overlapping range.

Alternatively, the image generator 210 may provide a figure list, and may generate an image by receiving a selection of one or more figures included in the figure list and then combining the selected figures.

In this case, the "figure list" refers to a list of figures selectable by the user. The figure list may include one or more types of figures. Even the same type of figure may be subdivided into figures having multiple colors, multiple patterns, or multiple transparency levels.

The figure list may be determined based on the user information of the user. The "user information" of the user is general information about the user or about a character in a game controlled by the user. The "user information" of the user may include, for example, information about the gender, and play time of the user or the level, occupation, class, status, and skill of the user character.

Furthermore, the figure list may be determined according to an amount paid by the user. For example, as the user pays a larger amount, more types of figures may be included.

According to another embodiment, the image generator 210 may provide a production interface capable of receiving input for the generation of an image, and may generate an image based on user input through the production interface.

For example, the image generator 210 may provide a production interface, and may generate an image including a picture drawn by the user in the production interface or a figure placed by the user in the production interface.

Figure 3:
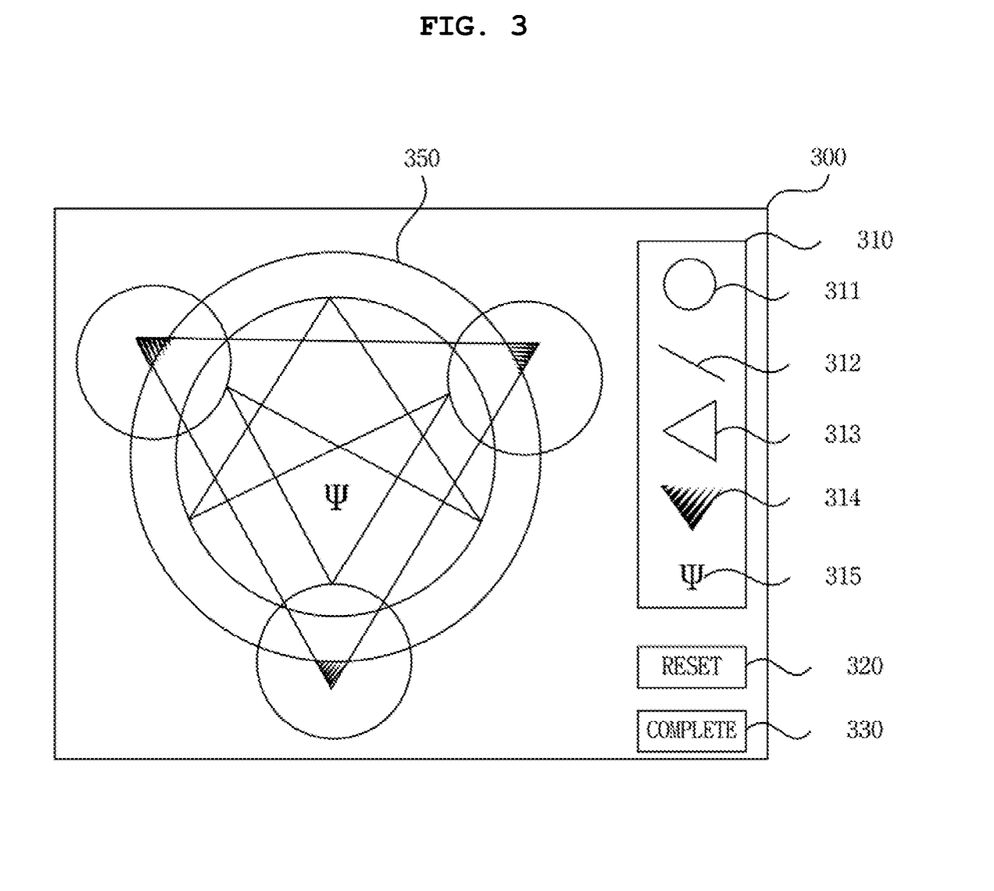
FIGS. 3 to 6 are views illustrating examples of the apparatus for providing a game according to an embodiment.
Figure 4:
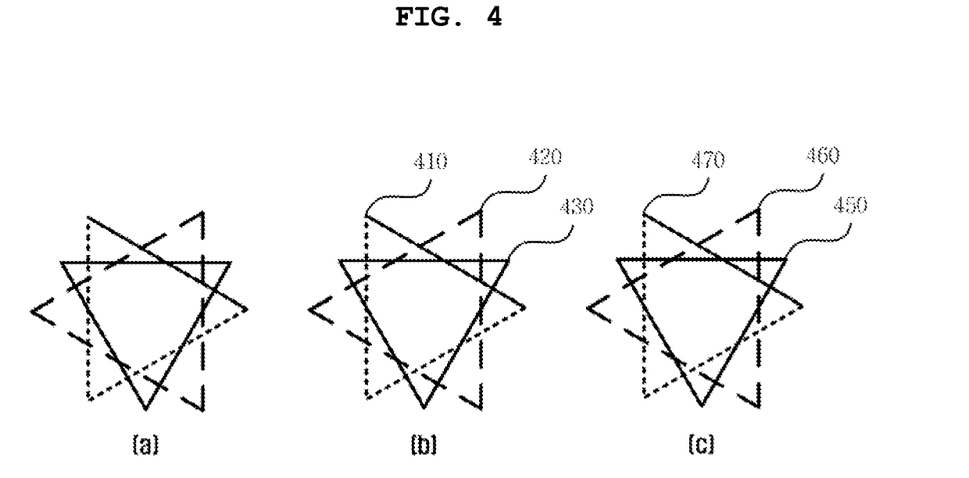

In relation to this, FIG. 3 shows an example of the production interface displayed through the screen of an electronic terminal in which the apparatus 100 for providing a game is implemented.

As shown in FIG. 3, the production interface 300 may provide a figure list 310. The figure list 310 may include, for example, FIGS. 311 and 313 composed of closed curves, a FIG. 312 composed of a line, a FIG. 314 including a pattern, and a FIG. 315 composed of lines to shape a character. As the selected figures are placed in the production interface 300 upon receiving a selection input of the user for the figure list 310, a magic figure image 350 composed of a combination of a plurality of figures 311, 312, 313, 314, and 315 may be generated. Additionally, the production interface 300 may include a reset button 320 configured to delete all produced images or a completion button 330 configured to receive an input for the completion of production of an image in order to assist the user in smooth image production.

Such a production interface may be located as a game object in a game space, or may be provided as a separate window through a game screen.

When the image is generated by the image generator 210 as described above, the matcher 220 generates a game object by matching one or more effects to the image.

According to an embodiment, the matcher 220 may generate a game object by matching one or more effects to the image and thus generating an item.

In this case, the "effect" is a graphical representation that appears in the game space according to the activation of the game object, and represents a state in which the appearance of the game object is changed by changing the game object according to a preset pattern. For example, when an effect appears by activating a game object, the position, shape, size, color, highlight line, shadow, glitter, transparency, and/or the like of the game object are applied according to a preset pattern, thereby attracting the attention of the user.

The matcher 220 may determine an effect to be matched to the image.

According to an embodiment, when an image is generated by the combination of figures, the matcher 220 may determine an effect based on at least one of the type of combined figures and the order of combination of the figures.

For example, the matcher 220 may match only the effect of light emission to an image in which the figures of a circle and a triangle are combined with each other, and may match the effect of the striking of lightning on an image to the image in which the figures of a circle and a star are combined with each other.

Furthermore, for example, the matcher 220 may match a different effect when the order of combination of figures constituting an image is different even for the same image.

In other words, as shown in FIG. 4(a), the matcher 220 may match an effect to an image generated by overlapping three triangular figures.

In this case, different effects may be set for a case where a FIG. 410 is placed at a bottom, a FIG. 420 is placed on it, and a FIG. 430 is finally placed when the figures are combined as shown in FIG. 4(b), and a case where a FIG. 450 is placed at a bottom, a FIG. 460 is placed on it and a FIG. 470 is finally placed when the figures are combined as shown in FIG. 4(c), respectively. For example, the image shown in FIG. 4(b) may provide an effect in which the FIG. 410, the FIG. 420, and the FIG. 430 are sequentially drawn, and may finally provide the image shown in FIG. 4(a) to the game space. In contrast, the image shown in FIG. 4(c) may provide an effect in which the FIG. 450, the FIG. 460, and the FIG. 470 are sequentially drawn, and may finally provide the image shown in FIG. 4(a) to the game space.

Therefore, even when the image shown in FIG. 4(b) and the image shown in FIG. 4(c) are the same as the image shown in FIG. 4(a), different effects may be matched thereto because the orders of combination of figures are different.

According to another embodiment, the matcher 220 may determine the effect based on the user information of the user.

For example, the matcher 220 may determine the effect according to the level of the user character.

When the effect is determined as described above, the matcher 220 may generate a game object by matching the effect to the image.

Furthermore, the matcher 220 may set a condition for the activation of the game object after determining the effect.

For example, when the effect is determined according to the level of the character, the matcher 220 may make a setting so that only a character having a level higher than the level of a user character that has produced the game object can activate the game object.

Alternatively, for example, the matcher 220 may make a setting so that only a user character using a predetermined skill or having a predetermined status can activate the corresponding game object.

Furthermore, the matcher 220 may match a plurality of effects to the game object, and may allow at least one of the plurality of effects to be activated according to an activation condition.

For example, the matcher 220 may match a plurality of effects based on the coordinates of the game object relative to a user character in the game space.

In this case, the coordinates have the same dimensions as the dimensions of the game space. Accordingly, for example, the coordinates of the game object relative to a user character in a three-dimensional game space may have three-dimensional coordinates with a user character intending to use the game object as the center.

Accordingly, the matcher 220 may match different effects for respective sets of coordinates of the game object relative to the user character. Through this, when the game object is activated, an effect may appear near the feet of the user character. In contrast, when the game object is activated with the head of the user character as the center, an effect different from the above-described effect may appear.

After the game object has been generated, the matcher 220 may match an additional condition for the generation of an additional effect and an additional effect corresponding to the additional condition to the game object.

The term "additional effect" refers to an effect other than an effect already matched to the game object. Accordingly, when there is an effect already matched to the game object, the already matched effect appears when the game object is activated. However, when the additional condition is satisfied, only the additional effect is provided, or the additional effect is provided in addition to the preset effect corresponding to the game object.

For example, the matcher 220 may set as an additional condition the situation in which a plurality of users must be located at predetermined points relative to the game object in order to activate the game object, and may match an additional effect corresponding to the additional condition.

Alternatively, for example, the matcher 220 may set as an additional condition the situation in which a plurality of game objects must be located at predetermined points in the game space, and may match an additional effect corresponding to the additional condition.

Furthermore, in addition to the effect on the image, the matcher 220 may at least temporarily improve the game performance ability of the character that activates the game object, may at least temporarily regress the game performance ability of objects blocking the game performance of the user among game objects or other user characters, or may additionally provide an opportunity to perform a given game given to the user or an opportunity to perform a specific action or exercise a special ability within the game.

Furthermore, the matcher 220 may match a status to the image in addition to the effect. Accordingly, for example, as the status of the game object increases, the duration of the effect may be changed when the game object is activated.

Meanwhile, the matcher 220 may generate a game object by determining an effect based on the input of the user and then matching the determined effect to an image.

For example, when the user sets a predetermined effect for the image produced by him or her, the matcher 220 may produce a game object by matching the image and the effect corresponding the input of the user to each other.

The matcher 220 may store the game object, generated as described above, in the memory 140 so that the game object can be used by the user later and so that the game object can be traded or shared and thus another user can use it.

Meanwhile, the object trader 230 according to an embodiment described in this specification performs the trade of a game object.

In other words, the object trader 230 may perform the trade of a game object between users through the sale or purchase of the game object according to a request from the user.

Accordingly, a purchased game object may be stored in the account of another user who has purchased the game object of one user so that the other user can use the purchased game object.

Furthermore, the object trader 230 may provide an available game object to a user who satisfies a predetermined qualification.

For example, the object trader 230 may store a game object in the user account of a user who is a guild member and allow the user to use the game object so that the user can use the game object corresponding to a guild to which he or she belongs. Through this, the game object corresponding to the guild may be shared among guild members.

The game object is allowed to be traded or shared, so that the user can boast of his or her production skill while showing off his or her produced game object. Through this, a user who has produced an eye-catching game object may become famous, which motivates the user to play a game, improves the sense of immersion in the game, and consequently maintains the retention of the game.

Meanwhile, when a request for the use of the game object is received from the user, the object activator 240 provides an effect corresponding to the game object.

For example, the object activator 240 may allow the effect corresponding to the game object to be activated with a user character in the game space as the center.

Alternatively, for example, as the object activator 240 causes the user character to activate the game object, the object activator 240 may allow the user character to acquire a predetermined skill.

Alternatively, for example, as the object activator 240 causes the user character to activate the game object, the object activator 240 may at least temporarily improve the game performance ability of the user character like an item, may at least temporarily regress the game performance ability of objects blocking the game performance of the user among game objects or other user characters, or may additionally provide an opportunity to perform a game given to the user character or an opportunity to perform a specific action or exercise a special ability within the game.

In contrast, according to an embodiment, the object activator 240 may allow the user to activate the game object generated by the user.

According to still another embodiment, when a game object produced by another user is purchased or the user belongs to the same guild as another user, the object activator 240 may allow the user to activate the game object produced by the other user.

According to another embodiment, when a request for the use of the game object is received, the object activator 240 may allow the user to activate the game object when the user satisfies an activation condition set for the game object.

For example, for the game object that can be used by only a user character having a predetermined or higher level, the game object may be allowed to be activated by referring to the character level of the user.

Alternatively, for example, the object activator 240 may allow the game object to be activated only when the user character uses a predetermined skill.

Alternatively, for example, the game object may be allowed to be activated based on the coordinates of the game object requested to be activated for the user character. For example, when the user character requests a game object configured to be activated only on the hand of the character to be activated near his or her waist, the game object is not activated. When the user character requests the game object to be activated on his or her hand, the game object may be activated.

Meanwhile, when the user activates the game object, the object activator 240 may determine whether an additional condition for the application of an additional effect is satisfied, and may provide the additional effect accordingly.

In relation to this, although the present invention may be used by a single user, the object activator 240 may provide an additional effect when an additional condition in which a plurality of users is located at points on a game object is satisfied.

Figure 5:
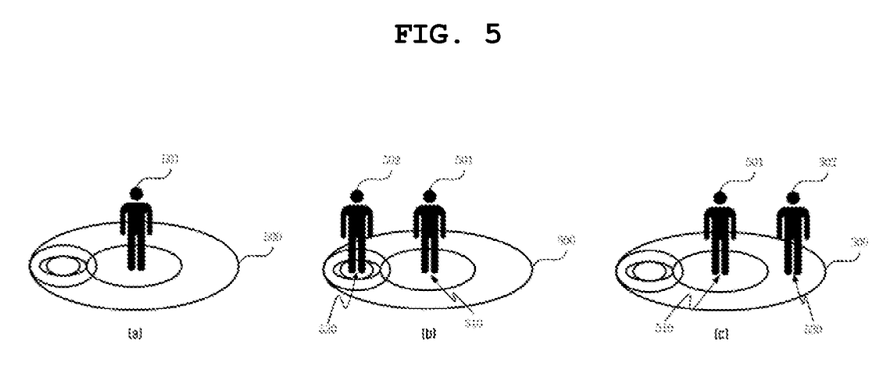

As shown in FIG. 5(*a*), a user 501 may generate an effect by using a magic FIG. 500 as a game object that can be activated by one user. In this case, when a plurality of users 501 and 502 is located at predetermined points 510 and 520 relative to the magic FIG. 500 as shown in FIG. 5(*b*), the object activator 240 may provide an additional effect. In this case, it may be possible to determine whether to provide the additional effect to the magic FIG. 500 according to the points of a plurality of users. For example, when the plurality of users 501 and 502 is located at points 510 and 530 relative to the game object as shown in FIG. 5(*c*), the additional effect may not be provided.

Furthermore, although the present invention may be used by a single user, the object activator 240 may provide an additional effect when an additional condition in which a predetermined number of users use game objects at predetermined points is satisfied. In other words, the additional effect may be provided based on the game object of the user character and the other game object of another user character.

Figure 6:
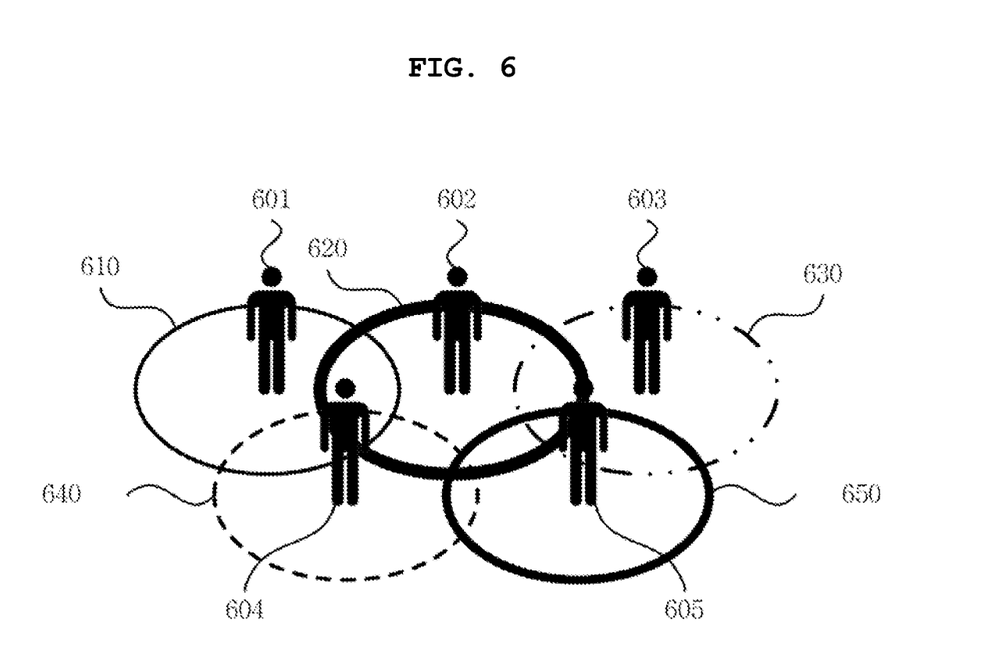

In relation to this, as shown in FIG. 6, a plurality of user characters 601, 602, 603, 604, and 605 may use their own game objects 610, 620, 630, 640, and 650, respectively, and may be provided with corresponding effects, respectively. However, when an additional condition in which the plurality of user characters 601, 602, 603, 604, and 605 is located at predetermined points in a game space and the game objects 610, 620, 630, 640, and 650 are activated with their characters as the centers and form the Olympic flag is satisfied, the object activator 240 may provide an additional effect in which the game objects 610, 620, 630, 640, and 650 are changed into the colors of the Olympic flag, respectively.

As described above, the apparatus 100 for providing a game may activate an effect matched to a game object when the user uses the game object generated based on an image produced by the user. Accordingly, the apparatus 100 for providing a game may play a game using the game object produced by the user, through which a three-dimensional game item may be provided and game content may be enriched.

Figure 7:
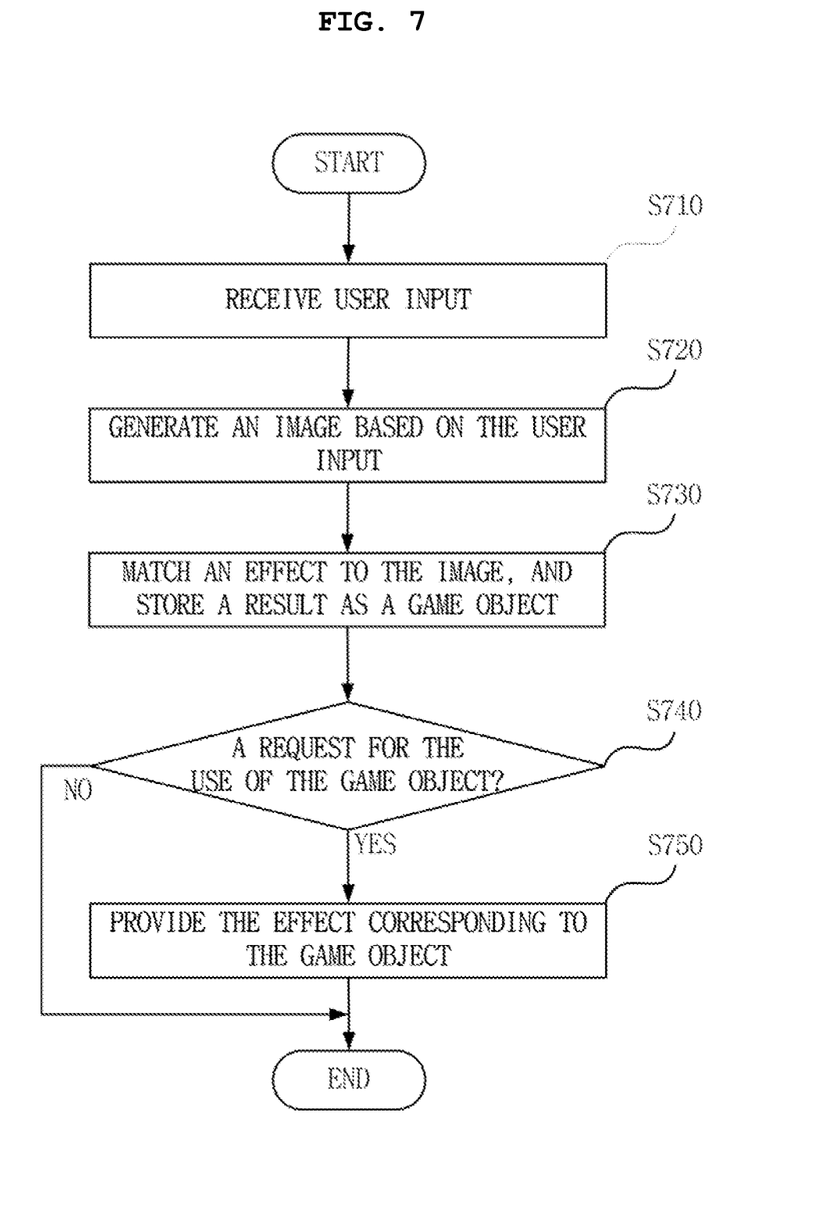
FIG. 7 is a flowchart illustrating a method for providing a game according to an embodiment.

FIG. 7 is a flowchart illustrating a method for providing a game according to an embodiment.

The method for providing a game according to the embodiment shown in FIG. 7 includes steps that are performed in a time-series manner in the apparatus 100 for providing a game shown in FIGS. 1 to 6. Accordingly, the descriptions that are omitted below but are given above in conjunction with the apparatus 100 for providing a game shown in FIGS. 1 to 6 may also be applied to the method for providing a game according to the embodiment shown in FIG. 7.

As shown in FIG. 7, the apparatus 100 for providing a game may receive user input at step S710.

In addition, the apparatus 100 for providing a game may generate an image based on the user input at step 3720.

An image may be generated by combining one or more figures selected by a user.

For example, the apparatus 100 for providing a game may generate an image by combining figures in such a manner as to display all the figures by overlapping them or to delete part of a figure located below within an overlapping range.

Alternatively, for example, the apparatus 100 for providing a game may provide a figure list for the purpose of generating an image, and may generate an image by receiving a selection of one or more figures included in the figure list and then combining the selected figures.

The figure list may be determined according to at least one of the user information of a user and an amount paid by the user. For example, as the user has a higher level or pays a larger amount, more types of figures may be included.

Furthermore, for example, the apparatus 100 for providing a game may provide a production interface capable of receiving input for the generation of an image, and may generate an image based on user input through the production interface.

At step S730, the apparatus 100 for providing a game may generate a game object by matching at least one effect to the image generated in the above manner and store the game object.

For example, the apparatus 100 for providing a game may combine figures selected by the user. The apparatus 100 for providing a game may determine an effect based on at least one of the type of combined figures and the order of combination of the figures.

Alternatively, for example, the apparatus 100 for providing a game may determine an effect based on the user information of the user.

Furthermore, the apparatus 100 for providing a game may set not only at least one effect but also a condition for the activation of a game object for the image.

For example, the apparatus 100 for providing a game may make a setting so that only a user character using a predetermined skill or having a predetermined level can activate a corresponding game object.

Alternatively, the apparatus 100 for providing a game may match a plurality of effects to the game object, and may allow at least one of the plurality of effects to be activated according to an activation condition.

For example, the apparatus 100 for providing a game may match a plurality of effects based on the coordinates of a game object relative to a user character in a game space.

Furthermore, for example, after a game object has been generated, the apparatus 100 for providing a game may match an additional condition for the generation of an additional effect and an additional effect corresponding to the additional condition to the game object.

For example, the apparatus 100 for providing a game may set as an additional condition the situation in which a plurality of users must be located at predetermined points relative to the game object in order to activate the game object, and may match an additional effect corresponding to the additional condition.

Alternatively, for example, the apparatus 100 for providing a game may set as an additional condition the situation in which a plurality of game objects must be located at predetermined points in the game space, and may match an additional effect corresponding to the additional condition.

Furthermore, for example, the apparatus 100 for providing a game may implement the game object like an item, so that a user character can use the game object for the playing of a game.

Furthermore, for example, the apparatus 100 for providing a game may additionally match a status or the like to the game object.

The apparatus 100 for providing a game may store the game object generated as described above so that the game object can be used by the user later and so that the game object can be traded or shared and thus another user can use it.

In addition, when a request for the use of a game object is received at step S740, the apparatus 100 for providing a game may provide an effect corresponding to the game object at step S750.

For example, the apparatus 100 for providing a game may allow the effect corresponding to the game object to be activated with a user character in the game space as the center.

Furthermore, for example, the apparatus 100 for providing a game may allow the user character having used the game object to acquire a predetermined skill.

Furthermore, for example, as the user character uses the game object, the apparatus 100 for providing a game may affect the progression of the game, like an item.

Furthermore, for example, when a request for the use of the game object is received, the apparatus 100 for providing a game may determine whether an activation condition set for the game object by the user is satisfied, and may allow the game object to be activated when the activation condition is satisfied.

For example, the apparatus 100 for providing a game may cause the game object to be activated only when the user character uses a predetermined skill.

Alternatively, for example, the apparatus 100 for providing a game may allow the game object to be activated based on the coordinates of the game object in the game space. For example, when the user character requests a game object configured to be activated only on the waist of the character to be activated near his or her feet, the game object is not activated. When the user character requests the game object to be activated on his or her waist, the game object may be activated.

Meanwhile, when the user uses the game object, the apparatus 100 for providing a game may determine whether the additional condition for the application of the additional effect is satisfied while providing the effect matched to the game object, and may provide the additional effect accordingly.

For example, the apparatus 100 for providing a game may provide an additional effect based on the points of the user and another user relative to the game object. In other words, although the present invention may be used by a single user, the apparatus 100 for providing a game may provide an additional effect when an additional condition in which a plurality of users is located at points on a game object is satisfied. Furthermore, even when a plurality of users is located at points on the game object, the apparatus 100 for providing a game may determine that an additional condition is satisfied only when they are located at designated points on the game object, and may then provide an additional effect.

Furthermore, for example, the apparatus 100 for providing a game may provide an additional effect based on a game object and another game object. In other words, although the present invention may be used by a single user, the apparatus 100 for providing a game may provide an additional effect when an additional condition in which a predetermined number of users use their own game objects at predetermined points is satisfied.

As described above, the apparatus 100 for providing a game may activate the effect matched to the game object when the user uses the game object generated based on the image produced by the user. Accordingly, the apparatus 100 for providing a game may provide three-dimensional game content, so that the immersion of the user in the game is enhanced, with the result that game retention may be maintained or new users may be attracted.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more CPUs in a device or secure multimedia card.

The method for providing a game according to the embodiment described in conjunction with FIG. 9 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method for providing a game according to the embodiment described in conjunction with FIG. 9 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method for providing a game according to the embodiment described in conjunction with FIG. 9 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to any one of the above-described technical solutions, there may be proposed the apparatus and method for providing a game.

According to any one of the above-described technical solutions, there may be proposed the apparatus and method for providing a game that use a game object produced by a user. Accordingly, an image drawn by the user may be used as in-game content such as an item or skill.

According to any one of the above-described technical solutions, there may be proposed the apparatus and method for providing a game that impart an effect to a game object produced by a user. Accordingly, various effects and functions may be imparted to a picture image drawn by the user, and a game using a game object whose appearance and characteristics are determined by the user may be provided.

According to any one of the above-described technical solutions, there may be proposed the apparatus and method for providing a game that enable a game object produced by a user to be traded and shared. Accordingly, the user may show off his/her own production skill while showing off the game object produced by him or her, which enhances the sense of immersion of the user in a game.

The effects that can be obtained by the embodiments disclosed herein are not limited to the above-described effects, and other effects that have not been described above will be clearly understood by those having ordinary skill in the art, to which the present invention pertains, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. An apparatus for providing a game, the apparatus comprising:
   a controller configured to provide a production interface including a figure list determined based on user information of a user who plays the game, and to generate an image by using one or more figures selected from the figure list and placed in the production interface by the user or a picture drawn by the user in the production interface, to generate and store a game object by matching at least one effect configured based on an input from the user to the image, and to provide the effect corresponding to the game object when a request for use of the game object is received from the user in the game; and storage configured to store the game object, wherein the production interface is located in a game space as another game object.

2. The apparatus of claim 1, wherein the controller is further configured to combine a plurality of figures selected by the user and to match one or more effects based on a type of the plurality of figures and an order of combination of the plurality of figures.

3. The apparatus of claim 1, wherein the controller is further configured to provide at least one effect based on coordinates of the game object relative to a user character in the game space.

4. The apparatus of claim 1, wherein the controller is further configured to provide the effect corresponding to the game object, and to provide an additional effect based on the game object and another game object.

5. The apparatus of claim 1, wherein the controller is further configured to provide the effect corresponding to the game object, and to provide an additional effect based on points of the user and another user relative to the game object.

6. The apparatus of claim 1, wherein the controller is further configured to generate a magic figure item by matching an effect to the image.

7. A method for providing a game, the method being performed by an apparatus for providing a game, the method comprising:

providing a production interface including a figure list determined based on user information of a user who plays the game, and generating an image by using one or more figures selected from the figure list and placed in the production interface by the user or a picture drawn by the user in the production interface;

generating and storing a game object by matching at least one effect configured based on an input from the user to the image; and providing the effect corresponding to the game object when a request for use of the game object is received from the user in the game, wherein the production interface is located in a game space as another game object.

8. The method of claim 7, wherein generating and storing the game object comprises combining a plurality of figures selected by the user and matching one or more effects based on a type of the plurality of figures and an order of combination of the plurality of figures.

9. The method of claim 7, wherein providing the effect comprises providing at least one effect based on coordinates of the game object relative to a user character in the game space.

10. The method of claim 7, wherein providing the effect comprises providing the effect corresponding to the game object and providing an additional effect based on the game object and another game object.

11. The method of claim 7, wherein providing the effect comprises providing the effect corresponding to the game object and providing an additional effect based on points of the user and another user relative to the game object.

12. A non-transitory computer-readable storage medium having stored thereon a program for causing an apparatus for providing a game to execute:

providing a production interface including a figure list determined based on user information of a user who plays the game, and generating an image by using one or more figures selected from the figure list and placed in the production interface by the user or a picture drawn by the user in the production interface;

generating and storing a game object by matching at least one effect configured based on an input from the user to the image; and providing the effect corresponding to the game object when a request for use of the game object is received from the user in the game, wherein the production interface is located in a game space as another game object.

13. A computer program that is stored in a non-transitory computer-readable storage medium and for causing an apparatus for providing a game to perform:

providing a production interface including a figure list determined based on user information of a user who plays the game, and generating an image by using one or more figures selected from the figure list and placed in the production interface by the user or a picture drawn by the user in the production interface;

generating and storing a game object by matching at least one effect configured based on an input from the user to the image; and providing the effect corresponding to the game object when a request for use of the game object is received from the user in the game, wherein the production interface is located in a game space as another game object.

\* \* \* \* \*